(12) United States Patent
Hüttner et al.

(10) Patent No.: US 9,612,321 B2
(45) Date of Patent: Apr. 4, 2017

(54) METHOD FOR ANGLE DETERMINATION FOR MOVING ASSEMBLIES, AND APPARATUS

(71) Applicant: SIEMENS AKTIENGESELLSCHAFT, München (DE)

(72) Inventors: Jörg Hüttner, Munich (DE); Andreas Ziroff, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 333 days.

(21) Appl. No.: 14/350,315

(22) PCT Filed: Oct. 8, 2012

(86) PCT No.: PCT/EP2012/069863
§ 371 (c)(1),
(2) Date: Apr. 7, 2014

(87) PCT Pub. No.: WO2013/050597
PCT Pub. Date: Apr. 11, 2013

(65) Prior Publication Data
US 2014/0285374 A1    Sep. 25, 2014

(30) Foreign Application Priority Data

Oct. 7, 2011  (DE) .................. 10 2011 084 176

(51) Int. Cl.
*G01S 13/02*    (2006.01)
*G01S 7/40*     (2006.01)
(Continued)

(52) U.S. Cl.
CPC .............. *G01S 13/02* (2013.01); *G01S 7/025* (2013.01); *G01S 7/4026* (2013.01);
(Continued)

(58) Field of Classification Search
CPC . G01S 7/02; G01S 7/024; G01S 7/025; G01S 7/40; G01S 7/4004; G01S 7/4026;
(Continued)

(56) References Cited

U.S. PATENT DOCUMENTS 5,289,160 A * 2/1994 Fiorletta ............... B60C 23/009
116/34 R
6,369,703 B1 * 4/2002 Lill ..................... B60C 23/0416
340/442
(Continued)

FOREIGN PATENT DOCUMENTS

DE    102006029122 A1    12/2007
DE    102011084176.8    10/2011
(Continued)

OTHER PUBLICATIONS

S. Hinske, "Determining the Position and Orientation of Multi-Tagged Objects Using RFID Technology"; proceedings of the "Fifth Annual IEEE International Conference on Pervasive Computing and Communications Workshops '07"; pp. 377-381; White Plains, NY, USA; 2007; ISBN 0-7695-2788-4.*
(Continued)

*Primary Examiner* — Bernarr Gregory
(74) *Attorney, Agent, or Firm* — Slayden Grubert Beard PLLC (57) ABSTRACT

In an installation including first and second components, a radar sensor that has at least two channels, each arranged to be spatially at a distance from the other, is motion-coupled to the first component, and at least two coding radar targets, each arranged to be spatially at a distance from an adjacent target, are motion-coupled to the second component. A signal is sent to each of the radar targets using one of the at least two channels of the radar sensor. At least one coded signal is respectively sent by the radar targets upon or after receiving such a signal, one of the at least two coded signals
(Continued)

being received by one or more channels of the radar sensor from each target. The temporal relationship between at least two of the received coded signals is acquired and used to determine an angle between the first and second components.

25 Claims, 4 Drawing Sheets (51) Int. Cl.
    *G01S 13/75* (2006.01)
    *G01S 13/87* (2006.01)
    *G01S 7/02* (2006.01)
    *G01S 13/00* (2006.01)

(52) U.S. Cl.
    CPC .......... *G01S 13/751* (2013.01); *G01S 13/753* (2013.01); *G01S 13/755* (2013.01); *G01S 13/874* (2013.01); *G01S 2007/403* (2013.01); *G01S 2007/4034* (2013.01)

(58) Field of Classification Search
    CPC ....... G01S 2007/403; G01S 2007/4034; G01S 13/02; G01S 13/74; G01S 13/75; G01S 13/751; G01S 13/753; G01S 13/755; G01S 13/87; G01S 13/874; G01D 21/00; G06K 7/0008; G06K 7/10; G06K 7/10009; G06K 7/10316; G06K 7/10336; B60C 23/001; B60C 23/004; B60C 23/005; B60C 23/009; B60C 23/02; B60C 23/04; B60C 23/0408; B60C 23/0415; B60C 23/0416; B61L 25/02; B61L 25/04; B61L 25/041; B61L 25/045
    See application file for complete search history.

(56) References Cited

U.S. PATENT DOCUMENTS

| | | | | |
|---|---|---|---|---|
| 6,518,877 B1 * | 2/2003 | Starkey | ................ | B60C 23/004 340/447 |
| 6,694,231 B1 * | 2/2004 | Rezk | ................... | B61L 25/045 701/19 |
| 6,999,861 B2 * | 2/2006 | Katou | ................ | B60C 23/0416 116/34 R |
| 7,348,878 B2 * | 3/2008 | Fogelstrom | ........... | B60C 23/009 340/438 |
| 7,614,555 B2 * | 11/2009 | Sullivan | ............... | G06K 7/0008 235/435 |
| 7,688,184 B2 * | 3/2010 | Shimomura | ........ | B60C 23/0408 340/426.33 |
| 8,154,402 B2 * | 4/2012 | Tayrani | .................. | G01D 21/00 340/539.1 |
| 8,292,173 B2 * | 10/2012 | Yturralde | ........... | G06K 7/10336 235/385 |
| 2004/0030466 A1 * | 2/2004 | Rezk | ..................... | B61L 25/045 701/19 |
| 2004/0041698 A1 * | 3/2004 | Lin | ..................... | B60C 23/0408 340/447 |
| 2006/0145922 A1 | 7/2006 | Hill | | |
| 2009/0102610 A1 * | 4/2009 | Lance | .................. | G06K 7/0008 340/10.2 |
| 2009/0281419 A1 | 11/2009 | Troesken et al. | | |

FOREIGN PATENT DOCUMENTS

| | | |
|---|---|---|
| EP | 2 369 363 A1 | 9/2011 |
| WO | 02/095442 A1 | 11/2002 |
| WO | 2011/047899 A1 | 4/2011 |

OTHER PUBLICATIONS

L. Bolotnyy et al., "The Case for Multi-Tag RFID Systems"; proceedings of the "International Conference on Wireless Algorithms, Systems and Applications, 2007. WASA 2007"; pp. 174-186; Chicago, IL, USA; 2007; ISBN 978-0-7695-2981-3.*

Office Action issued Dec. 31, 2014 in corresponding Chinese Patent Application No. 201280049473.X.

International Search Report for PCT/EP2012/069863 dated Mar. 5, 2013.

* cited by examiner

METHOD FOR ANGLE DETERMINATION FOR MOVING ASSEMBLIES, AND APPARATUS

CROSS REFERENCE TO RELATED APPLICATIONS

This application is the U.S. national stage of International Application No. PCT/EP2012/069863, filed, Oct. 8, 2012 and claims the benefit thereof. The International Application claims the benefit of German Application No. 10 2011 084 176.8 filed on Jul. 10, 2011, both applications are incorporated by reference herein in their entirety.

BACKGROUND

Described below is a method for angle determination for moving assemblies and to an apparatus.

It is regularly necessary, in the case of apparatuses or installations having assemblies that can move relative to one another, to obtain relative situation or angle information between these moving assemblies. By way of example, in trains it is beneficial to ascertain the angular position of the axle-supporting bogies relative to the car body.

Methods for angle determination using rotary transducers are known that are based on optical methods. Methods that use electrical resistive layers in order to determine the angle-proportional length of a picked-off circular arc are likewise known. From military engineering, inertia-based angle determination methods are known. However, these methods can be used only to a severely limited extent in the harsh industrial setting. Many of the methods cannot be used adequately in dirty, damp and highly vibratory surroundings. Frequently, there is also no constructional way of mounting appropriate angle determination sensors.

SUMMARY

Described below is a method for determining the angle between a first assembly and a second assembly that can move relative to the first assembly that is improved in comparison with the related art. In addition, an improved arrangement is described which has a first assembly and a second assembly that can move relative to the first and also an apparatus and an installation that each allow the method for determining the angle to be carried out in an improved manner.

The method is used for determining the angle between a first assembly and a second assembly that can move, particularly that can move in rotation, relative to the first assembly. In particular, the first and second assemblies are assemblies in an installation. In this case, this angle is expediently the relative angle of rotation for first and second assemblies that can move in rotation with respect to one another. The method involves the use of a radar sensor that has at least two channels, each of which is arranged so as to have its motion coupled to the first assembly and which are physically spaced from one another, in particular, and at least two coding radar targets, each of which is arranged so as to have its motion coupled to the second assembly and which are physically spaced from one another, in particular. The method involves one of the at least two channels of the radar sensor being used to send a signal to at least one of the radar targets. Whenever such a signal is or has been received, one of these, e.g., different, radar targets is used to send at least one coded signal, wherein one of the at least two coded signals is received by one or more channels of the radar sensor, and wherein the temporal relationship between at least two of the received coded signals is ascertained and used to determine the angle.

Within the context of this application, the temporal relationship between at least two coded signals is intended to be understood to mean particularly the chronology and/or a relative time offset, in relation to one another, of the coded signals.

A channel of a radar sensor within the context of this disclosure is understood in each case to mean a transmission and reception unit of the radar sensor, particularly one of a plurality of antennas of the radar sensor that are each in the form of either a transmission antenna or a reception antenna.

The system described below has a first assembly and a second assembly that can move relative to the first. Included are a radar sensor having at least two channels, each of which is arranged so as to have its motion coupled to the first assembly and which are physically spaced from one another, and at least two coding radar targets, each of which is arranged so as to have its motion coupled to the second assembly and which are physically spaced from one another.

The system may include at least one evaluation device that is designed to ascertain the temporal relationship between at least two coded signals. The evaluation device also may be designed to separate at least the coded signals explicitly or implicitly beforehand, particularly by the MUSIC and/or ESPRIT method.

It is self-evident that, in the case of developments of the method, references to apparatus-oriented developments are intended to be understood such that the apparatus-oriented developments may be used while or for the purpose of performing the method according to the invention.

The method provides the possibility of precisely ascertaining the temporal relationship between the coded signals, particularly in the possibility of phase determinations for a series of radar targets in conjunction with the possibility of performing precise angle determination operations on the basis of this temporal relationship and particularly on the basis of phase information. An important advantage of this approach is the separability of the signals from the radar targets and hence the possibility of precise and robust determination of the angle. In addition, angle determination can advantageously be performed on the basis of systems operated at very low power or even zero power, particularly radar targets operated at low power or even at zero power. A further advantage is the usability of very inexpensively producible devices/components. Particularly the radar targets used can be used following manufacture in very large numbers and can thus yield very high robustness and precisions in the system. By way of example, this advantage is obtained when SAW-based radar targets (SAW: surface acoustic wave) are used, particularly in the case of surface wave devices. Even when devices that modulate reflection amplitude are used, it is possible to attain very inexpensive manufacture.

A further advantage is obtained from the usability of radio techniques in comparison with optical angle measurement methods and results in a very high level of attainable robustness that is particularly expedient in the harsh industrial setting. A further advantage is obtained from the possibility of two-dimensional angle determination. To this end, both radar targets and the expediently existent antennas of the radar system may be arranged in a two-dimensional distribution. Advantages of the various types of radar target that can be used are obtained from the resultant degrees of freedom for component and frequency selection to achieve an optimum solution to application problems. In the case of electrical resonators, these may also be mechanically produced components. The radar targets may have simple electronic circuits. This allows the applicability of the invention to be broadened significantly.

The radar sensor is may be capable of selectively receiving signals from particular directions and determining this direction. In one advantageous development of the invention, the radar sensor is designed such that only such signal components as come from meaningful reception directions are taken into account within the system, whereas the signals arriving from non-meaningful directions are rejected. This has a particularly advantageous effect when the radar sensor needs to be operated in a setting in which multipath propagation of the radio-frequency signals occurs. The meaningful limitation of the reception angle then has a very positive effect on robustness in the face of the multipath propagations.

An expedient aspect in this case is, which allows the angle measurement on the basis of a multichannel radar sensor in conjunction with particular radar targets that identify themselves to the radar sensor in a specific manner. This specific manner of "identification" is called "coding" within the context of this application.

In a simple development, the radar sensor is a multichannel radar sensor, the antennas of which radiate in a linear arrangement into parts of a half-space.

In one development of the invention, the radar targets are arranged linearly and are expediently likewise arranged within this half-space, as a result of which they are visible to the radar sensor.

The radar sensor now receives signals from the n specifically coded radar targets on its m (m=number of channels) channels. The signals that are received on channel k (the channel number k numbers the channels in a physical order, for example a direction) from the radar target j (the radar target number j numbers the radar targets in a physical order, for example a direction) differ first and foremost in the signal phase from the signal received on channel k+1 from the radar target j. The signal phase is proportional to the propagation time over the wave number, and therefore the difference in the phases between the channels k and k+1 is a measure of the difference in the paths of the signals and hence a measure that can be used to determine the angle between the arrangement of the channels of the radar sensor and the arrangement of the radar targets.

If the signals that are sent by the radar targets now contain sufficiently easily distinguishable coding, algorithms can be used to perform adequate separation of the, in particular m*n (n=number of radar targets), signal components that arise and to perform angle estimation for the angle from the phases of the, in particular m*n, signal components. In this case, the separation of the signal components does not necessarily have to be performed explicitly, but instead implicit separation is sufficient, as accomplished by the algorithms/methods known as "MUSIC" (MUSIC: Multiple Signal Classification) or "ESPRIT" (ESPRIT: Estimation of Signal Parameters via Rotational Invariance Techniques), for example.

To detect the radar targets, it is possible to use an FMCW radar (FMCW: Frequency Modulated Continuous Wave), for example. Alternative radar concepts such as pulse radars, frequency-stepped continuous wave (FSCW) radars or Doppler radars are likewise possible. In this case, the optimum selection of the radar concept will also be dependent on the type of radar target and should be customized thereto.

The arrangement of the antennas of the radar sensor and also the arrangement of the radar targets do not necessarily need to be equidistant on a line but rather can be generalized for arbitrary arrangements. In this case, calibration and algorithms need to be customized as appropriate.

The coding of the radar targets may be based on amplitude-modulated or phase-modulated reflectivity for the radar target, for example. Such modulations of the reflectivity are very easy to implement using what are known as base-point-modulated antennas.

The coding of the various radar targets is then obtained by suitably chosen different modulation frequencies, for example.

The coding of the signals by the radar targets can likewise be attained by what are known as surface wave devices that send the received signal with characteristic time delays again. These characteristic time offsets can, provided that they are chosen in a suitable manner, likewise be attributed to the individual radar targets sufficiently well.

A further possible form of coding is the selective switching on and off of individual radar targets. This possibility is an embodiment of the amplitude modulation described previously.

A further option is the use of radar targets that contain a resonant device. When resonances with very good quality factors are used, these resonances can arise over a very narrowband spectrum and in this way can likewise be detected very well when the resonant frequencies used are at a sufficiently great interval from one another.

A further option for coding is the use of different polarizations. It is thus expediently possible for a first target to have horizontal polarization while a second has vertical polarization. These polarizations can then be separated accordingly easily.

A further option for coding is electronically mediated sending of a digital or analog response signal in response to a received signal. An example in this regard is the use of RFID tags as radar targets.

A further option is applying environmental influences that arise at the position of the radar targets to the signal properties of the signal reflected by the radar target in a suitable manner. Such environmental influences may be temperature fluctuations or pressure fluctuations, for example. If these environmental influences act on the radar targets in an uncorrelated manner and hence also change the reflection properties of the radar targets in an uncorrelated manner, it is possible to separate the radar targets by also using this statistical reflection profile over time and to use them for angle measurements.

Combinations of the coding types described previously are also possible in principle.

The number of multiple channels of the radar sensor results in an advantageous option for the estimation or determination of the angle at the radar, $\alpha$. Determination of the angle $\beta$ at the radar targets is likewise possible under certain conditions. In this case, it is expedient to know the phase relationship between the received and resent signals from the radar targets. If this is known, it is possible to compare the phases of the signal measured between channel j and radar target k and the signal measured between channel j and radar target k+1. In the case of $\beta \neq 0$, these then carry an additional, angle-dependent phase shift from which it is possible to determine the angle $\beta$.

A challenge with this type of comparison of the phases of the radar targets is in many cases the knowledge of the precise reflection phases of the radar targets. Depending on the application, this might well not always be known a priori. Advantageously, it is often possible to use suitable calibration algorithms (e.g. measurement of the radar signal for zero angles and possibly further angular positions) to allow sufficiently good estimation of the reflection phases of the radar targets involved.

The channels of the radar sensor may be designed such that it is possible to use channel t to send a signal and also to receive this signal again on a further channel r. This significantly increases the number of measured data items and, when suitable signal processing is used, the data evaluation can sometimes take place much more robustly and/or precisely.

On the basis of the measured radar signals and the phase measurement, it is sometimes also possible to perform range measurement with a high level of precision. To this end, the propagation time of the signals received by the radar sensor can be measured, for example. The methods that can be used for determining a range are known and are not cited in more detail at this juncture.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
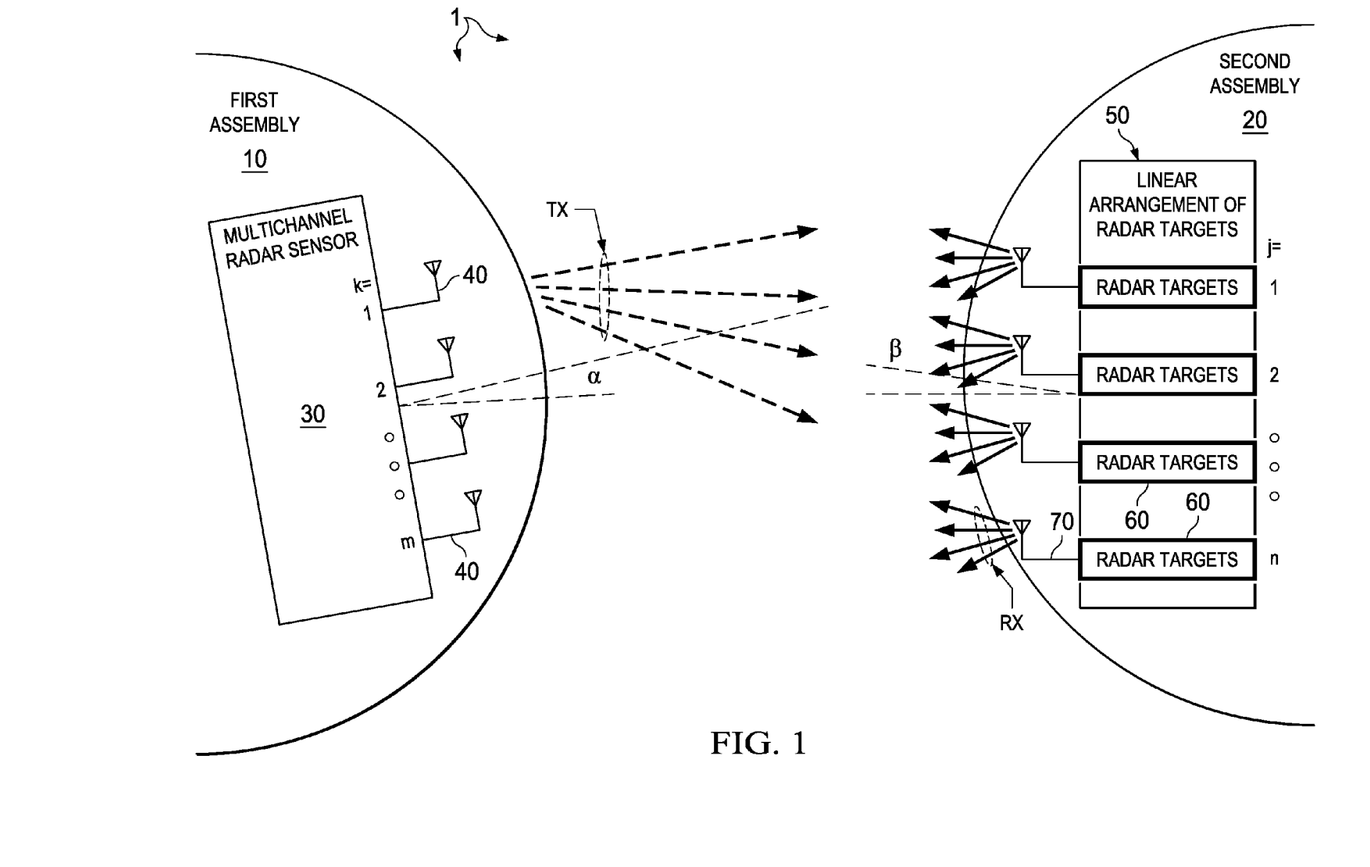
FIG. 1 a side view of a first assembly and a second assembly that can move relative to the first with a radar sensor and radar targets.

In FIG. 1 are a first assembly 10 and a second assembly 20 that can move relative thereto in an installation 1. In the exemplary embodiment shown, the first 10 and the second 20 assembly are arranged, in each case so as to be able to move in rotation, relative to the imaginary connecting line between the first assembly 10 and the second assembly 20 (in exemplary embodiments that are not expressly shown, which otherwise correspond to the exemplary embodiment shown, the first assembly 10 is arranged so as to be able to rotate, whereas the second assembly 20 is positioned in a manner fixed against rotation, or else the second assembly 20 is arranged so as to be able to rotate, whereas the first assembly 10 is positioned in a manner fixed against rotation; furthermore, in further exemplary embodiments, the first and second assemblies may also be able to move in translation relative to one another).

Arranged on the first assembly 10 is a multichannel radar sensor 30 having m channels, i.e. having m sensor antennas 40, which are each either in the form of a transmission antenna or in the form of a reception antenna (the m sensor antennas are each numbered with channel numbers k from 1 to m in FIG. 1). The multichannel radar sensor 30 is connected to the first assembly 10 at a fixed location and in a manner fixed against rotation, as a result of which each channel k=1, k=2, . . . , k=m is rigidly motion-coupled to the first assembly. In the case of the multichannel radar sensor 30 shown in FIG. 1, the m sensor antennas 40 are each arranged equidistantly with their channel numbers in succession on a straight line (in exemplary embodiments that are not expressly shown, the m sensor antennas 40 may also be arranged as a two-dimensional array).

Connected to the second assembly 20 is a linear (i.e. arranged on a straight line) arrangement 50 of equidistantly successive radar targets 60. For the purposes of clarity, the radar targets 60 in FIG. 1 are consecutively numbered with radar target numbers j in accordance with their succession (in exemplary embodiments that are not shown, the radar target 60 may also be arranged on the second assembly 20 as a two-dimensional array). Each of the radar targets 60, as illustrated in FIG. 1, has base-point-modulated antennas 70. In the exemplary embodiment, the base-point-modulated antennas 70 are in this case amplitude-modulated (in exemplary embodiments that are not expressly shown, the antennas 70 are phase-modulated). Owing to the amplitude modulation, the base-point-modulated antennas 70 code the respective response signals RX.

Figure 2:
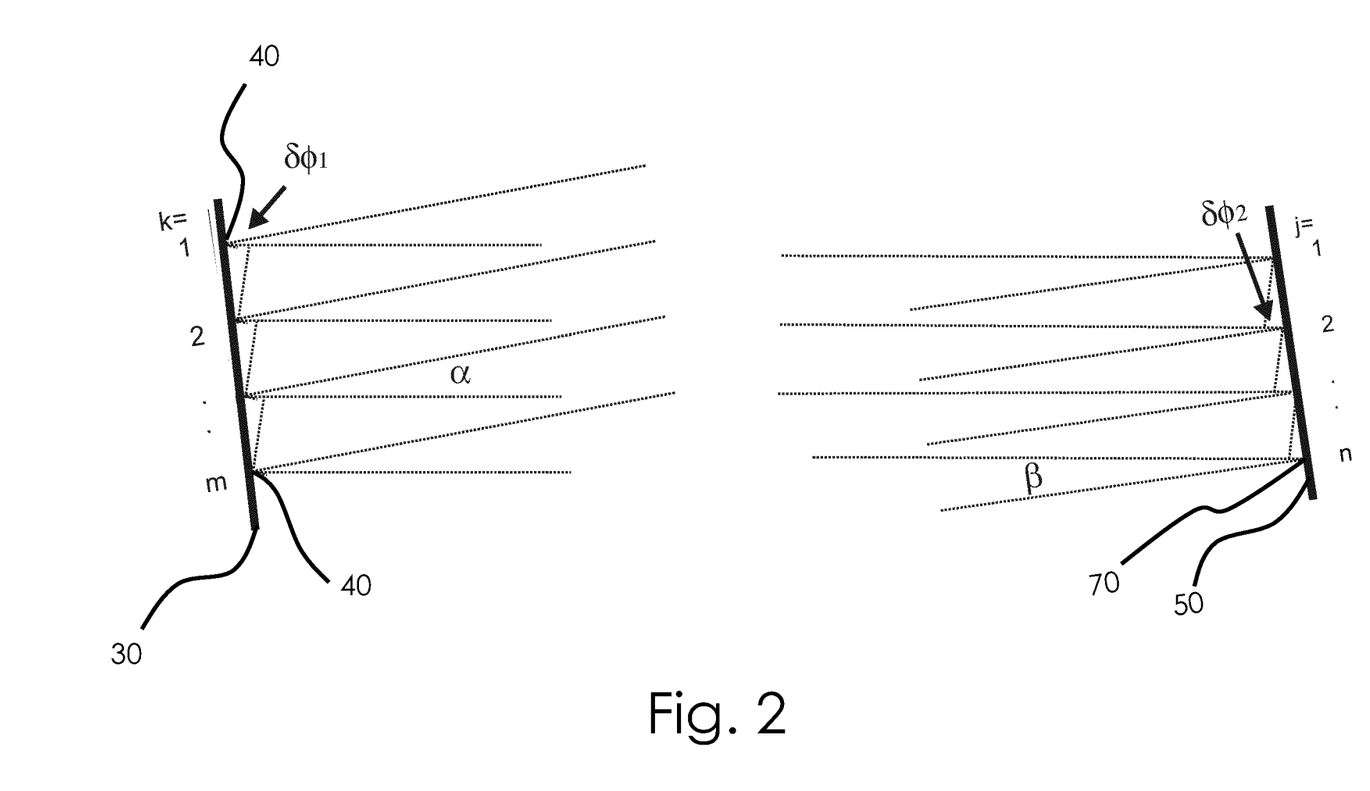
FIG. 2 is a basic outline of the phase relationships between signals respectively transmitted by the radar sensor and radar targets in the arrangement in FIG. 1.

The multichannel radar sensor 30 now uses its m sensor antennas 40 to send radar signals TX in the style of frequency-modulated continuous wave signals (FMCW) to the n radar targets 60. The n radar targets 60 receive the radar signals TX and then send response signals RX again. The m sensor antennas 40 of the multichannel radar sensor 30 in turn receive the response signals RX sent by the n radar targets 60. In this case, firstly the k-th sensor antenna 40 of the multichannel radar sensor 30 receives a response signal from the j-th radar target 60 and secondly the k+1-th sensor antenna 40 also receives a response signal from the j-th radar target 60. On account of the amplitude modulation of the response signals 60, the response signals from the individual radar targets 60 can each be separated in the multichannel radar sensor 30. k-th sensor antenna 40 and k+1-th sensor antenna 40 receive the respective response signal from the j-th radar target with a phase shift $\delta\phi_1$ (FIG. 2). On account of the separability of the response signals sent by individual radar targets 60, the total of m*n individual response signals received is used to determine the angle α of the connecting line between a first assembly 10 and second assembly 20 with respect to a zero angle relative to the first assembly 10, that is to say with respect to a zero orientation of the first assembly 10.

An evaluation device—not shown expressly in the figures—that has a signal connection to the individual channels of the multichannel radar sensor 30 is used to determine the separation of the respective received response signals implicitly by the algorithm known as "MUSIC" (multiple signal classification) or by the algorithm known as "ESPRIT" (estimation of signal parameters via rotational invariance techniques).

Furthermore, the angle β of the common connecting line between first assembly 10 and second assembly 20 with respect to a zero angle relative to the second assembly 20 is determined. To this end, the knowledge of the phase relationship between radar signal TX received by the radar target 60 and resent response signal RX is used. In this way, the response signal RX measured between j-th channel and k-th radar target and the response signal RX measured between j-th channel and k+1-th radar target are compared. In the case of β≠0, these response signals RX likewise carry a phase shift $\delta\phi_2$. From this phase shift $\delta\phi_2$, it is possible to determine the angle β of the common connecting line between first 10 and second 20 assembly with respect to a zero angle relative to the second assembly 20.

The phase relationship between radar signal TX received by the radar target 60 and re-sent response signal RX is in this case determined by measurements at a zero angle β=0 of the second assembly 20 with respect to the common connecting line between first assembly 10 and second assembly 20 and is used for calibration. In addition, further angular positions are used. These measurements allow sufficiently precise estimation of the phase relation at the location of the respective radar targets 60.

Figure 3:
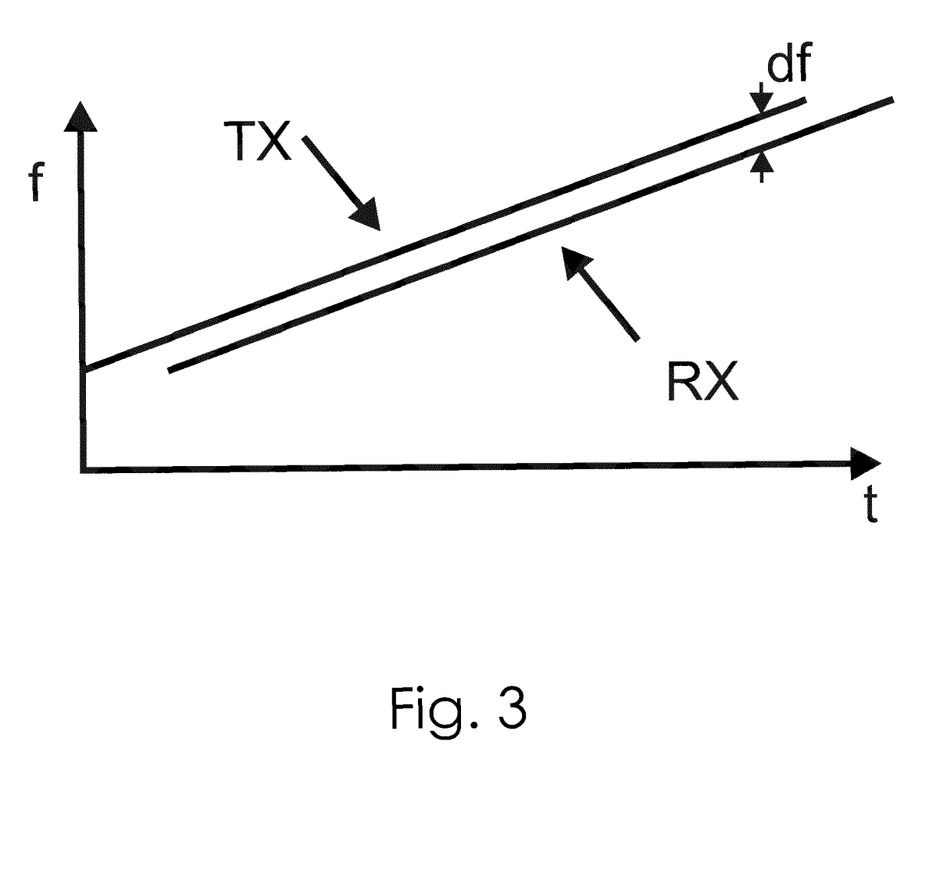
FIG. 3 is a graph of the time dependency of the transmission and reception frequencies of the radar sensor and the radar targets in FIG. 1.

To allow simple signal separation of the radar signals TX and the response signals RX, the frequency of the radar signals TX sent by the multichannel radar sensor 30 is changed over time in the manner of a sawtooth-like (in a linear presentation) profile, i.e. the frequency f of the from the channels of the multichannel radar sensor 30 is changed piece by piece linearly over time t in the style of a time-based ramp, for example as shown by ramps whose frequency rises over time t (FIG. 3). Accordingly, at a given instant, the response signals RX are received at a frequency f that is reduced, at in each case by an absolute value df, in comparison with the radar signals TX currently sent by the multichannel radar sensor 30.

Figure 4:
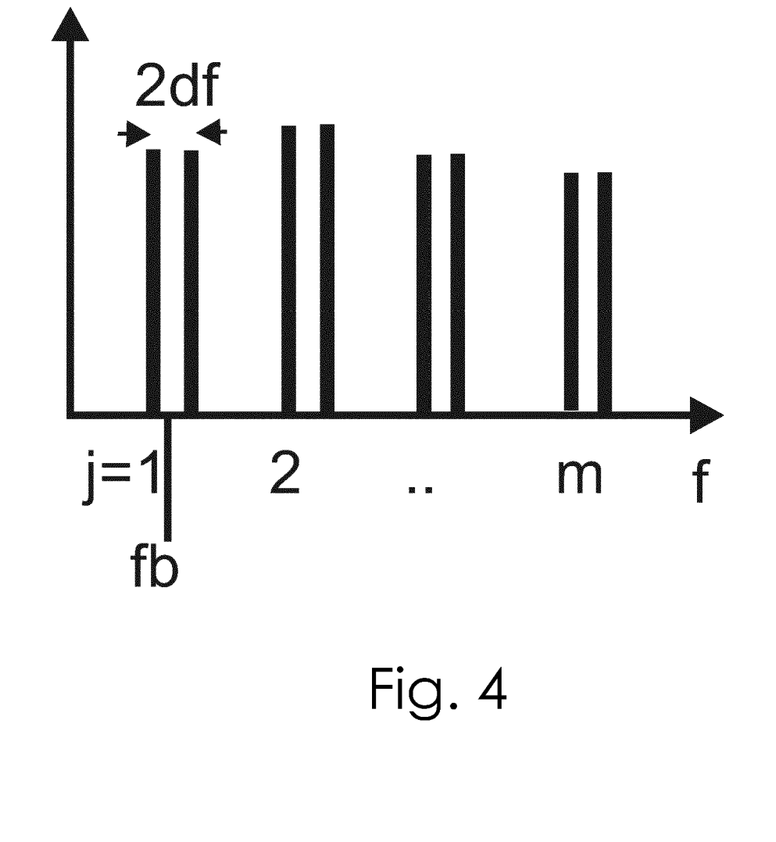
FIG. 4 is a graph of a mixed spectrum for the radar sensor in the arrangement in FIG. 1.

In the exemplary embodiment shown, the amplitude modulation of the radar signal TX received by the radar targets is accomplished by the selective switching on and off of individual radar targets 60. In this case, the switching on and off is effected at a switching frequency fb that is specific to the respective radar target 60 (cf. also FIG. 4). In this way, it is possible for the respective radar signals TX received by an individual radar target 60 and resent response signals RX to be separated spectrally in a known manner. In the spectrum in FIG. 4, this results in the respective switching frequency fb that is characteristic of the individual j-th radar target 60 having two frequency contributions that are grouped symmetrically around this switching frequency fb and that are spaced from one another by twice the absolute value df (2*df). These frequency contributions can be separated for evaluation as is known per se.

In a further exemplary embodiment, which is not shown, the radar targets 60 are realized differently by RFID tags. In this case, the coding of the response signals RX may be provided by various polarization directions for the response signals RX. Furthermore, it is possible to use radar targets that have a resonant device having very high quality factors and thus correspondingly narrowband resonant frequencies. In this case, the resonant frequencies have sufficient spectral spacing from one another for the purpose of precise detection. Further realization of radar targets is possible by SAW-based (SAW: surface acoustic wave) radar targets.

As an alternative to the exemplary embodiment shown, it is furthermore possible to use multichannel radar sensors that operate by pulse radar, FSCW radar or as Doppler radar.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for determining an assembly angle between a first assembly and a second assembly movable relative to the first assembly, comprising:

coupling a radar sensor with at least two channels physically spaced apart from each other, each channel coupled to the first assembly such that motion of the first assembly causes motion of the respective channel;

coupling at least two coding radar targets physically spaced apart from each other, each coding radar target coupled to the second assembly such that motion of the second assembly causes motion of the respective coding radar target;

sending, from the at least two channels of the radar sensor, a sensor signal to the coding radar targets;

sending, respectively by the coding radar targets in response to the sensor signal, at least one coded signal;

receiving at least two coded signals from at least two of the coding radar targets by at least one channel of the radar sensor;

ascertaining a temporal relationship between the at least two coded signals received; and determining the assembly angle from the temporal relationship.

2. The method as claimed in claim 1, further comprising calibrating the temporal relationship based on at least one known calibration angle between the first and the second assembly, and wherein said determining of the assembly angle relies on said calibrating.

3. The method as claimed in claim 2, wherein each of at least one channel of the radar sensor has at least one transmitter sending radar signals;

at least one reception device receiving radar signals; and an antenna shared by the at least one transmitter and the at least one reception device.

4. The method as claimed in claim 2, wherein said sending and receiving by at least one channel of the radar sensor is performed by at least one of frequency modulated continuous wave radar, pulse radar, frequency-stepped continuous wave radar and Doppler radar.

5. The method as claimed in claim 4, wherein at least one of the coding radar targets has a base-point-modulated antenna with at least one of amplitude-modulating reflectivity and phase-modulating reflectivity.

6. The method as claimed in claim 4, wherein said sending by at least one of the coding radar targets sends as the coded signal a received signal with a characteristic time delay generated by a surface wave device.

7. The method as claimed in claim 4, further comprising switching on or off at least one of the coding radar targets.

8. The method as claimed in claim 4, wherein said sending by at least one of the coding radar targets sends as the coded signal a previously received signal with changed or stipulated polarization.

9. The method as claimed in claim 4, wherein said sending by each of a plurality of the coding radar targets sends as the coded signal an environmental signal dependent on at least one of pressure, temperature, and changes in pressure and/or temperature over time.

10. The method as claimed in claim 9, wherein the channels and/or the coding radar targets are linearly arranged equidistantly apart.

11. The method as claimed in claim 10, wherein said ascertaining of the temporal relationship between the at least two coded signals includes separating the at least two of the coded signals explicitly or implicitly, by at least one of multiple signal classification and estimation of signal parameters via rotational invariance techniques.

12. The method as claimed in claim 11, wherein said ascertaining of the temporal relationship between the at least two coded signals is based on a relative phase relationship between the at least two coded signals.

13. An apparatus including a first assembly and a second assembly movable relative to the first assembly, comprising:
   a radar sensor having at least two channels physically spaced apart from each other and coupled to the first assembly such that motion of the first assembly causes motion of the at least two channels;
   at least two coding radar targets physically spaced apart from each other and coupled to the second assembly such that motion of the second assembly causes motion of the at least two coding radar targets; and
   an evaluation device ascertaining a temporal relationship between at least two coded signals by separating the coded signals explicitly or implicitly beforehand, based on at least one of multiple signal classification and estimation of signal parameters via rotational invariance techniques.

14. The apparatus as claimed in claim 13, wherein each of at least one channel of the radar sensor includes
   at least one transmitter sending radar signals;
   at least one reception device receiving radar signals; and
   an antenna shared by the at least one transmitter and the at least one reception device.

15. The apparatus as claimed in claim 14, wherein the at least one channel of said radar sensor operates as at least one of frequency modulated continuous wave radar, pulse radar, frequency-stepped continuous wave radar and Doppler radar.

16. The apparatus as claimed in claim 15, wherein at least one of said coding radar targets includes a base-point-modulated antenna with at least one of amplitude-modulating reflectivity and phase-modulating reflectivity.

17. The apparatus as claimed in claim 15, wherein at least one of said coding radar targets includes a surface wave device sending a received signal with a characteristic time delay.

18. The apparatus as claimed in claim 15, wherein at least one of said coding radar targets is switchable on and off.

19. The apparatus as claimed in claim 15, wherein at least one of said coding radar targets sends a previously received signal with changed or stipulated polarization.

20. The apparatus as claimed in claim 15, wherein each of a plurality of the coding radar targets sends an environmental signal dependent on at least one of pressure, temperature, and changes in pressure and/or temperature over time.

21. The apparatus as claimed in claim 20, wherein the channels and/or the coding radar targets are linearly arranged equidistantly apart.

22. The apparatus as claimed in claim 13, wherein said evaluation device ascertains the temporal relationship between the at least two coded signals by separating the at least two of the coded signals explicitly or implicitly, base on at least one of multiple signal classification and estimation of signal parameters via rotational invariance techniques.

23. The apparatus as claimed in claim 13, wherein said evaluation device ascertains the temporal relationship between the at least two coded signals based on a relative phase relationship between the at least two coded signals.

24. The apparatus as claimed in claim 23, wherein at least one channel of the radar sensor is directionally sensitive.

25. An installation comprising:
   a first assembly;
   a second assembly movable relative to the first assembly;
   a radar sensor having at least two channels physically spaced apart from each other and coupled to the first assembly such that motion of the first assembly causes motion of the at least two channels;
   at least two coding radar targets physically spaced apart from each other and coupled to the second assembly such that motion of the second assembly causes motion of the at least two coding radar targets; and
   an evaluation device ascertaining a temporal relationship between at least two coded signals by separating the coded signals explicitly or implicitly beforehand, based on at least one of multiple signal classification and estimation of signal parameters via rotational invariance techniques.

* * * * *